(12) United States Patent
Dunigan et al.

(10) Patent No.: US 10,549,972 B1
(45) Date of Patent: Feb. 4, 2020

(54) LOCKABLE FORK SYSTEMS AND METHODS FOR INDUSTRIAL VEHICLES

(71) Applicant: Hyster-Yale Group, Inc., Fairview, OR (US)

(72) Inventors: Robert C. Dunigan, Benson, NC (US); Kenneth Williams, Greenville, NC (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 0 days.

(21) Appl. No.: 16/197,931

(22) Filed: Nov. 21, 2018

(51) Int. Cl.
| | |
|---|---|
| *B66F 9/14* | (2006.01) |
| *B60K 1/04* | (2019.01) |
| *B60L 50/60* | (2019.01) |
| *H01M 2/10* | (2006.01) |

(52) U.S. Cl.
CPC .............. *B66F 9/144* (2013.01); *B60K 1/04* (2013.01); *B60L 50/66* (2019.02); *H01M 2/1083* (2013.01)

(58) Field of Classification Search
CPC .......... B66F 9/144; B66F 9/143; B66F 9/142; B66F 9/141; B60K 1/04; B60K 2001/0405; B60L 50/66; H01M 2/1072; H01M 2/1077; H01M 2/1083
USPC ....................................................... 180/68.5
See application file for complete search history.

(56) References Cited

U.S. PATENT DOCUMENTS

| | | | |
|---|---|---|---|
| 2,592,091 A | 4/1952 | Weaver | |
| 3,854,748 A | 12/1974 | Goodacre | |
| 4,300,867 A | 11/1981 | Frees | |
| 4,615,533 A | 10/1986 | Sewell | |
| 4,969,794 A * | 11/1990 | Larsen | B62B 3/0618 280/43.12 |
| 5,354,080 A | 10/1994 | Jones | |
| 7,040,427 B2 | 5/2006 | Toomey | |
| 7,128,179 B2 | 10/2006 | Szymanski | |
| 7,175,379 B2 | 2/2007 | Sellhorn et al. | |
| 7,191,872 B2 | 3/2007 | Gramatikov et al. | |
| 7,207,405 B2 | 4/2007 | Reid et al. | |
| 7,641,011 B2 * | 1/2010 | Fridlington, Jr. | B62B 3/0618 180/68.5 |
| 7,731,206 B2 * | 6/2010 | Borrmann | B62B 3/008 280/47.34 |
| 8,833,736 B2 | 9/2014 | Feiquan et al. | |
| 8,919,472 B2 * | 12/2014 | Magens | B66F 9/065 180/68.5 |

(Continued)

FOREIGN PATENT DOCUMENTS

EP 3208175 A1 8/2017

OTHER PUBLICATIONS

Fully Powered Electric Pallet Trucks: Vestil Manufacturing; https://www.vestil.com/products/mhequip/pt-EPT.htm; printed Nov. 28, 2018; 4 pages

(Continued)

*Primary Examiner* — John D Walters
(74) *Attorney, Agent, or Firm* — Schwabe Williamson & Wyatt (57) ABSTRACT

A battery box and fork system for a vehicle having a first fork and a second fork configured to support one or more pallets positioned along a length of the first fork and the second fork. The first fork and the second fork are each independently lockable at their heel ends to a battery box.

20 Claims, 7 Drawing Sheets

(56) References Cited

U.S. PATENT DOCUMENTS

| | | | |
|---|---|---|---|
| 8,979,099 B1* | 3/2015 | Ellis | B66F 9/142 |
| | | | 280/43.12 |
| 2009/0078483 A1* | 3/2009 | Grothkopp | B62B 3/0612 |
| | | | 180/68.5 |
| 2013/0153840 A1 | 6/2013 | Feiquan | |
| 2015/0102274 A1 | 4/2015 | He et al. | |
| 2016/0264385 A1 | 9/2016 | Burrow | |
| 2017/0050832 A1 | 2/2017 | Newell | |

OTHER PUBLICATIONS

Extended European Search Report for European Patent Application No. 19155688.5, dated Aug. 23, 2019, pp. 8.

* cited by examiner

LOCKABLE FORK SYSTEMS AND METHODS FOR INDUSTRIAL VEHICLES

TECHNICAL FIELD

This application relates to forked vehicles configured to transport goods and materials, for example on a pallet.

BACKGROUND

Typical pallet trucks support one, two in-line, or three in-line standard size pallets. Typically, pallet trucks include lifting load forks that are welded at their rear end or heel end to a frame and/or battery box. The front end of the forks typically includes support rollers. A hydraulic system operates a lifting mechanism that moves the support rollers, and lifts the battery box and the forks together with goods, such as pallets loaded thereon. The support rollers are typically coupled to the lift mechanism, for example with a linkage that transmits the force from a hydraulic lifting cylinder to the support rollers. A valve arrangement is provided to relieve the hydraulic pressure in the lifting cylinder, thus lowering and placing the load on the floor. Steer wheels are located behind the battery box. A steering mechanism, such as a tiller, also may be provided to steer the steer wheels relative to the battery box and forks.

DETAILED DESCRIPTION

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of the invention is defined by the appended claims.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Figure 1:
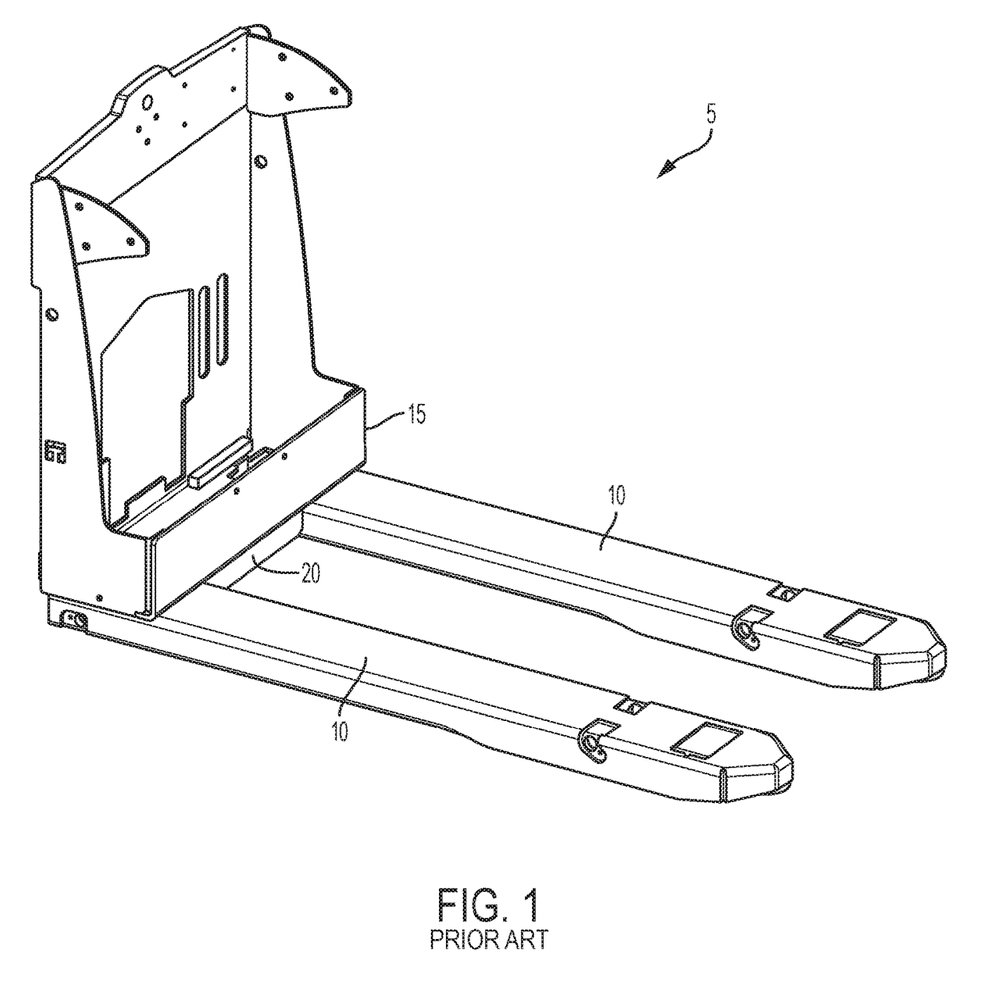
FIG. 1 illustrates a rear left isometric view of a prior art fork assembly, showing a pair of forks welded to the battery box.

FIG. 1 illustrates a front right isometric view of a prior art battery box and fork assembly 5 showing a pair of forks 10 welded to the battery box 15. As is typical with conventional pallet trucks, the forks 10 are permanently welded to the battery box 15 and to a torsion tube 20. Thus, the forks 10, battery box 15, and torsion tube 20 are permanently connected together, that is, they cannot be separated without some form of destructive separation technique such as grinding out the welds or cutting one component free from the others. While this configuration results in a strong joint between each individual fork 10, the battery box 15, and the torsion tube 20, such strength is achieved at the expense of both versatility in configuration and economy of packing and shipping.

One challenge faced by pallet truck manufacturers is that customers often need varying fork configurations such as forks with variable spreads, lengths, tips, and widths. Because forks are typically welded to the battery box, changing fork parameters requires costly and time-consuming retooling to modify the battery box and fork design to produce a pallet truck conforming to individual customer specifications. In some situations, such redesigns can add up to six weeks lead-time.

To overcome the aforementioned problems and others, the inventors have developed a modular fork and battery box system where the forks are locked to the battery box and may be unlocked to accommodate customer preference. In addition, this modular system allows for more efficient use of container space during shipping when compared against forks welded to a battery box. For example, the battery box and forks may be created at one plant, and shipped to another plant for final assembly into a pallet truck. When the forks 10 are welded to the battery box 15 and a torsion tube 20, as is typically done, the battery box and fork assembly 5 is bulky and does not pack efficiently into a shipping container. In contrast, a modular battery box and fork assembly with lockable forks, such as described and claimed herein, may be more efficiently packed into a shipping container because the forks do not need to be locked to the battery box prior to shipping. Such modular systems also provide for after-market modification of the fork configuration, and replacement of a damaged fork, without replacing the battery box or damaging the battery box by cutting into or otherwise altering the battery box to remove a fork welded to the battery box. These and other features provide a competitive advantage and differentiator in an exceedingly crowded market.

Turning to FIGS. 2-6, a battery box and fork assembly 30 includes a battery box 35 and two lockable forks 40. Locking a fork to a battery box, torsion member, or both, means that such fork can also be unlocked from the battery box, torsion member, or both. The battery box 35 is sized to fit a battery or battery array. When used in conjunction with a pallet truck, pallet jack, or other suitable forklift, the entire battery box and fork assembly 30 may be raised and lowered as a single unit, for example via a hydraulic cylinder.

The forks 40 may be considered as a right and left fork, respectively, depending on what side of the battery box 35 they are locked to. In the illustrated embodiment, the right and left fork are identical such that one could be swapped for the other. Each fork 40 includes several portions. The fully assembled fork 40 includes an optional heel portion 45, a central body portion 50, and a toe portion 55. For convenience and modularity, the heel portion 45, the body portion 50, and the toe portion 55 may be identical for both the left and right side of the battery box 35. Using identical components for both the left and the rights forks 40 increases the modularity of the system over a system in which the left and right forks are made with distinct, non-interchangeable components. However, distinct, non-interchangeable components may be used to create left and right forks in certain embodiments. The heel portion 45 and the toe portion 55 are connected to the central body portion 50, for example, by welding or other suitable attachment. With respect to the fork 40, the heel end is the end closest to the battery box 35, and may include an optional heel portion 45. The heel end of the fork 40 is configured to be locked to the battery box 35 and torsion member 60 as described below. The toe end is the opposite end furthest from the battery box 35 that initially engages a pallet when picking up a load.

Figure 2:
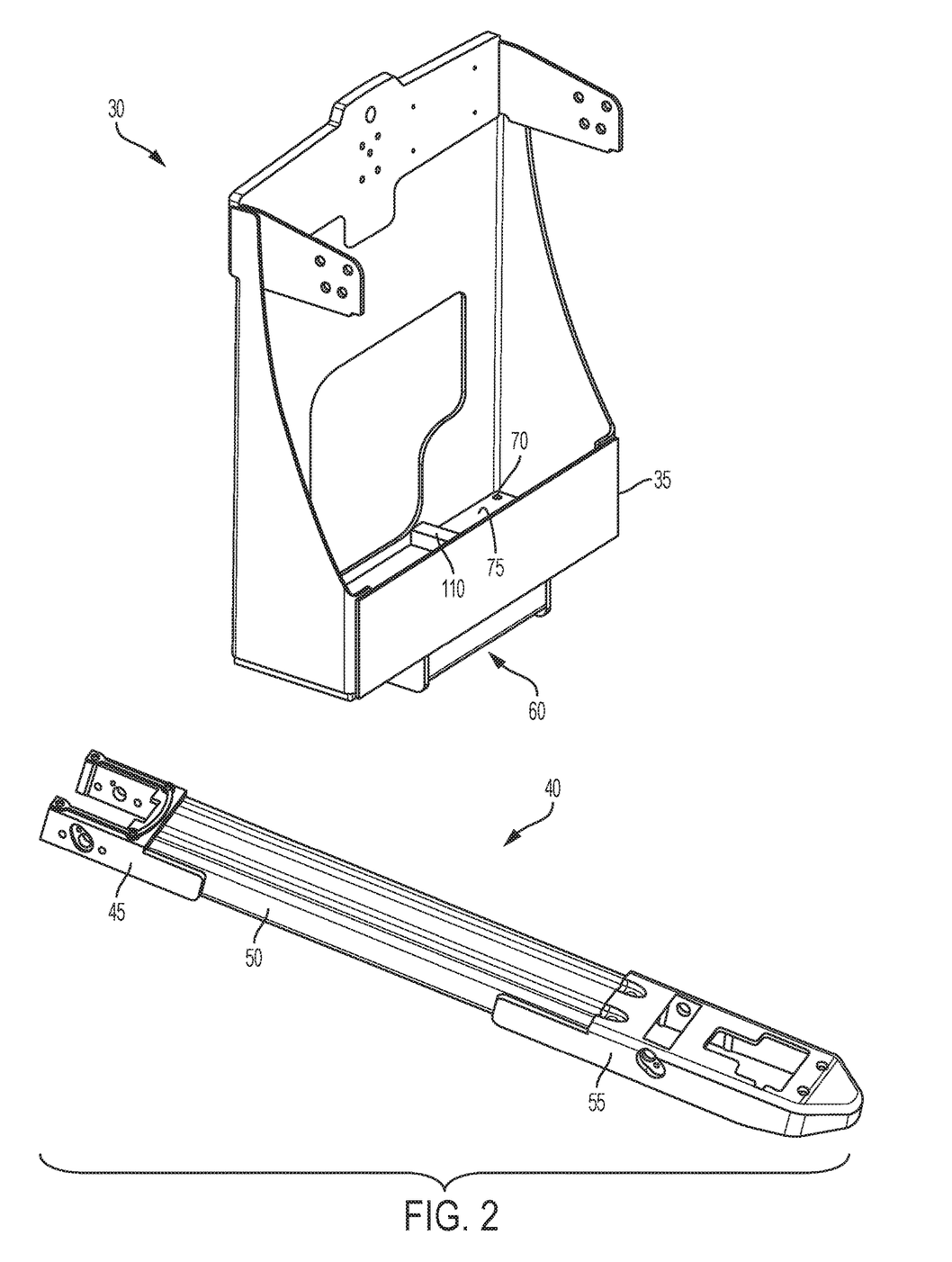
FIG. 2 illustrates a rear left isometric view of an example battery box and lockable fork showing the fork disassembled from the battery box.
Figure 3:
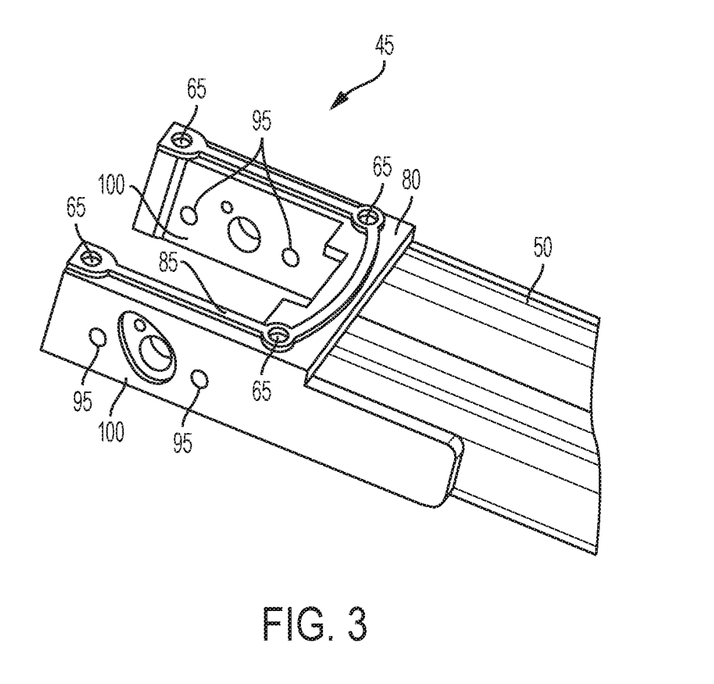
FIG. 3 illustrates a close-up, rear left isometric view of the fork of FIG. 2 centered on an example heel casting for a lockable fork.

FIG. 3 illustrates a close up of the heel portion 45 of the fork shown in FIG. 2. The heel portion may be cast metal, or machined from a solid metal billet, as a solid unitary body or single portion. However, even as a casting, several surface features of the heel portion 45 are optionally machined to create smooth surfaces. For example, a smooth surface may comprise a surface finished to an average surface roughness of 3.2 µm or less. Such machining is optionally performed before assembling the fork 40 using the heel portion 45, the body portion 50, and the toe portion 55. The heel portion 45 includes several features to facilitate securely locking the fork 40 to the battery box 35 and the torsion member 60 such that flex at the joint in inhibited, or minimized. The heel portion 45 includes a locking component, such as one or more bores 65, that engage a locking component, such as bores 70 in the base plate 75 of the battery box 35 (FIG. 2). Bores 65 may be blind bores or may pass completely through the upper surface 80 of the heel portion 45, and bores 65 may be smooth or threaded, depending on the type of fastener used with bores 65.

As shown in FIG. 3, the bores 65 are disposed on an optional raised boss 85 that is optionally machined to have a smooth surface to facilitate, or maximize, contact between the raised boss 85 and the bottom of the battery box base plate 75. Including a smooth surface on the upper portion of the raised boss 85 may enhance distribution of the forces exerted on the raised boss 85 when a load is applied to a fork 40, for example during a lifting or traveling operation. In one embodiment, the bores 65 are blind and are sized and threaded to accommodate fasteners, such as bolts 90 (FIG. 4), having sufficient strength to maintain a tight joint between the base plate 75 of the battery box 35 and the boss 85 of the heel portion 45. For example, bolts of class 8.8 and/or class 10.2 having a nominal diameter of about 12 mm may be used. Such bolts 90 may be tightened to a torque setting of 102 newton meters to facilitate creating a tight joint. In various embodiments, the heel portion 45 may include four bores 65 at the approximate corners of the boss 85. The placement of the bores 65 at the corners of the boss 85 may provide a fastener pattern that gives strength to the joint.

As shown in FIG. 3, the heel portion 45 also includes a locking component, such as bores 95, on both sides 100 of the heel portion 45. Sides 100 with their locking components are configured such that the locking components on the sides 100 are substantially orthogonal to the locking components on the upper surface 80. As with the bores 65, bores 95 may be blind bores or may pass completely through the side 100 of the heel portion 45, and bores 95 may be smooth or threaded, depending on the type of fastener used with bores 95. In some embodiments, when the battery box 35 and fork 40 are assembled, only a single side 100 of the heel portion 45 is locked to the torsion member 60. In other embodiments, the battery box 35 may contain additional surfaces that couple with both sides 100 of the heel portion 45 and both sides 100 of the heel portion 45 may be locked to the torsion member 60, battery box 35, or both. In various embodiments, bolts of class 8.8 and/or class 10.2 having a nominal diameter of about 10 mm are used, and the bores 95 are sized and threaded appropriately. Even if the other set of bores 95 (those on the opposite side 100 of the heel portion 45) are not used, they are included so that a fork 40 may be used either as a right or left fork in the assembled pallet truck. As with the boss 85, the sides 100 of the heel portion 45 are optionally machined smooth, to facilitate creating a tight joint to the torsion member 60 (see FIG. 5). The smooth surface may enhance surface area contact to form a tight fit of the forks 40 to the torsion member 60, and may inhibit flex that might otherwise lead to bolt fatigue and failure.

Figure 4:
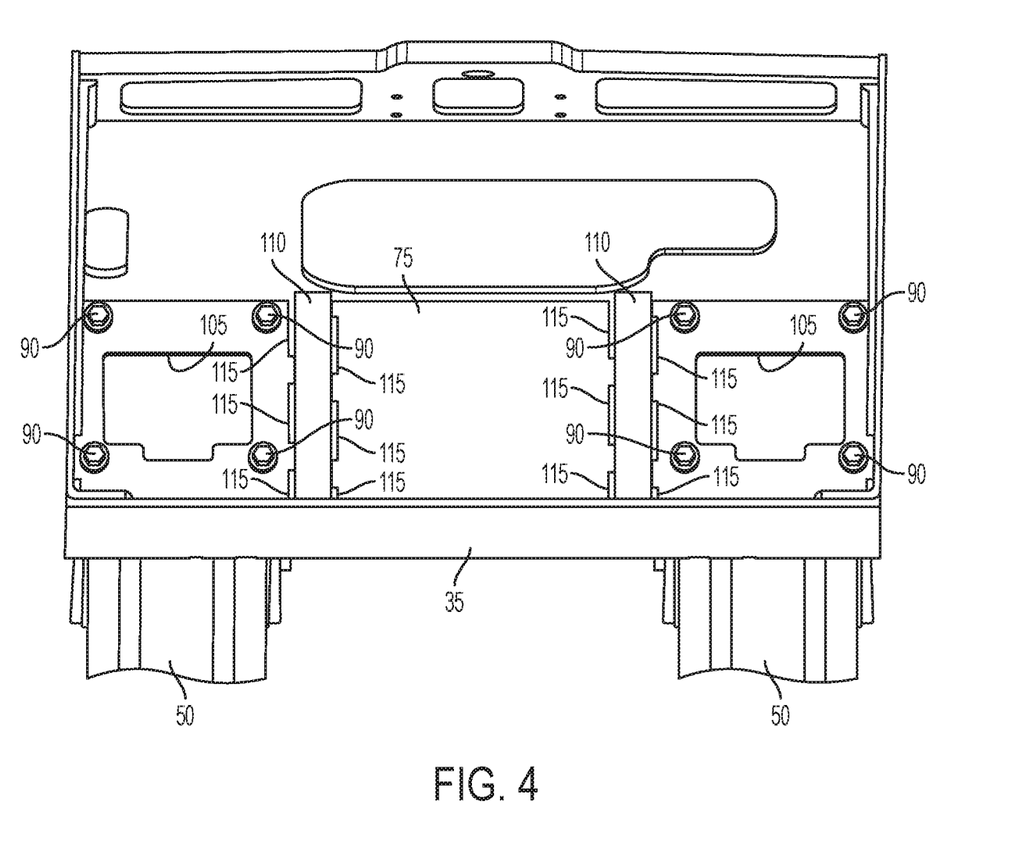
FIG. 4 illustrates a rear-top view of an example battery box and fork assembly showing a pair of example lockable forks bolted to the battery box.

FIG. 4 illustrates a top view of an example battery box and fork assembly 30, showing a pair of forks 40 locked to the battery box 35 via bolts 90. As shown in FIG. 4, the bottom of the battery box 35 includes a base plate 75 that extends the length and width of the bottom of the battery box 35. Cutouts 105 in the base plate 75 may be included to permit passage of linkage components (not illustrated for clarity) that move the load wheels (not illustrated) located at the toe ends 55 of the forks 40. The base plate 75 may be a separate plate that is welded or otherwise suitably attached to the battery box 35, or the base plate 75 may be formed as part of the battery box 35.

The battery box 35 optionally includes spacer bars 110. Spacer bars 110 may be coupled to the base plate 75 via welds 115, or otherwise suitably attached to the base plate 75. Spacer bars 110 may serve two purposes. One purpose is to elevate the bottom of a battery or battery array above the surface of the base plate 75 to provide additional clearance for passage of linkage components that move the load wheels located at the toe ends 55 of the forks 40. Another purpose may be to provide additional torsional resistance when differential loading is applied to one of the forks 40. For example, spacer bars 110 may be welded to the base plate 75 such that the spacer bards are aligned with the sides 120 and 125 of a torsion member 60 coupled to the battery box 35. By aligning the spacer bars 110 with the sides 120 and 125 of the torsion member 60, a larger section modulus may be created (compared to not aligning the spacer bars 110 with the sides 120 and 125 of the torsion member 60) that resists twisting of the base plate 75 when a differential load is applied to the forks 40.

With reference to FIGS. 3 and 4, a top surface 80/85 of each heel portion 45 is configured to be locked to the base plate 75 by including a locking component, for example, a set of bores 65. Likewise, the base plate 75 is configured to be locked to each heel portion 45 by including a locking component, for example, first and second sets of bores 70. The locking components of the base plate 75 may be considered to engage the locking components of the heel portions 45 when the underside of the base plate contacts the top surface 80/85 of each heel portion 45, and each of the bores 65 aligns with a corresponding bore 70 in the base plate 75.

Fasteners are included to lock the locking components together. For example, bolts 90 pass through eight smooth bore bores 70 in the base plate 75 and into the threaded, blind bores 65 in the boss 85 of the heel portion 45 of each fork 40. The bolts 90 are tightened, for example, to a torque setting of 102 newton meters, to lock each fork 40 to the base plate 75. In some embodiments, bores in the top surface of the heel portion may pass through the entire heel portion and may be smooth. Fasteners such as rivets or bolts with corresponding nuts may be used to lock such a fork heel portion to a battery box. In other embodiments, a heel portion may not be included and the locking component, such as one or more threaded or smooth bores, may be formed directly in the fork body. In addition to bolts and rivets, other suitable fasteners may be used to lock forks to a battery box, where such fasteners are constructed such that they are removable without damaging the battery box, torsion member, or fork.

Figure 5:
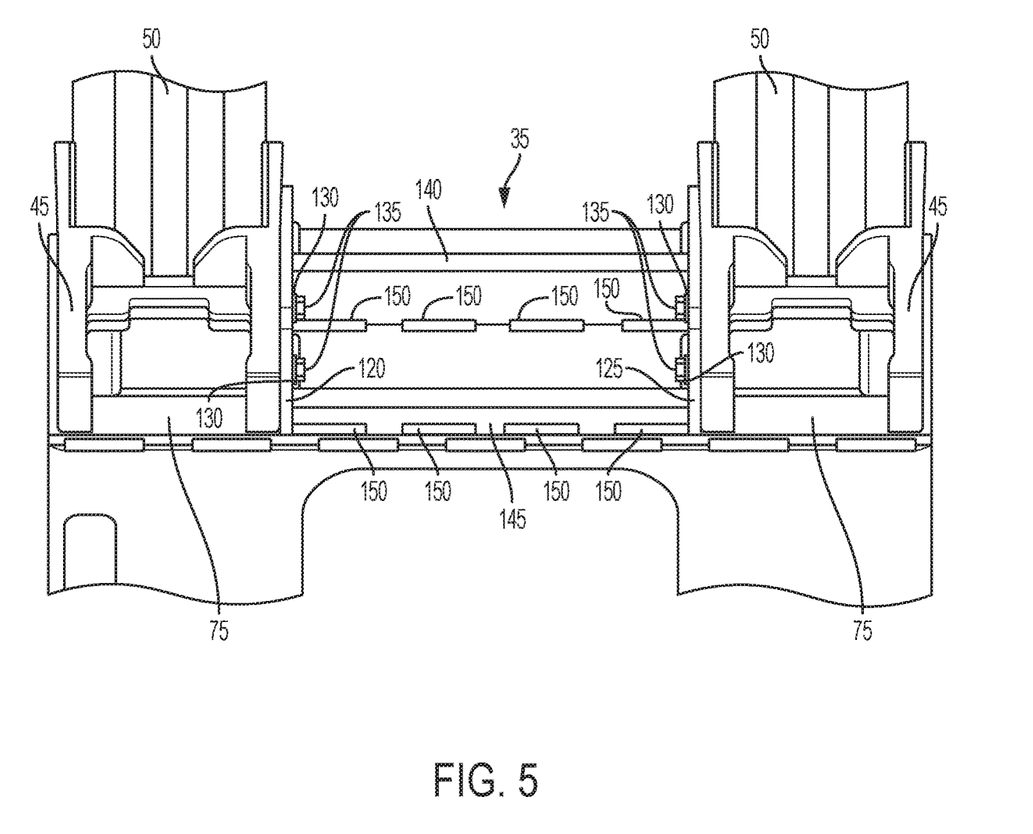
FIG. 5 illustrates a front-bottom view of the example fork assembly of FIG. 4, showing a pair of example lockable forks bolted to the battery box.

With reference to FIGS. 3 and 5, side surfaces 100 of each heel portion 45 are configured to be locked to the torsion member 60 by including a locking component, for example, a set of bores 95. Likewise, the torsion member 60 is configured to be locked to each heel portion 45 by including a locking component, for example, a first side 120 containing bores 130 and a second side 125 containing bores 130. The locking components of the torsion member 60 may be considered to engage the locking components of the heel portions 45 when the first side 120 of the torsion member 60 contacts a side 100 of a heel portion 45, the second side 125 of the torsion member 60 contacts a side 100 of a heel portion 45, and each of the bores 130 aligns with a corresponding bore 95. Optionally, the sides 100 of the heel portions 45 may be machined to include a smooth surface. Torsion member 60 side plates 120 and 125 may be made from sheet or plate steel, or may also optionally be machined to include a smooth surface.

Fasteners are included to lock the locking components together. For example, bolts 135 pass through bores 130 in the first side 120 and the second side 125 of the torsion member 60 and into the threaded, blind bores 95 in the sides 100 of the heel portion 45 of each fork 40. The bolts 135 are tightened, for example, to a torque setting of 55 newton meters to lock each fork 40 to the torsion member 60. In some embodiments, bores in the side surfaces of the heel portions may pass through the entire heel portion and may be smooth. Fasteners such as rivets or bolts with corresponding nuts may be used to lock such a fork heel portion to a torsion member. In other embodiments, a heel portion may not be included and the locking component, such as one or more threaded or smooth bores, may be formed directly in the fork body. In addition to bolts and rivets, other suitable fasteners may be used to lock forks to a torsion member, where such fasteners are constructed such that they are removable without damaging the battery box, torsion member, or fork.

With reference to FIG. 5, the torsion member 60 is formed from the first side 120, second side 125, a rear side 140 extending between the first side 120 and the second side 125, and a front side 145 extending between the first side 120 and the second side 125. The torsion member 60 is secured to the base plate 75, for example, via welds 150. In other embodiments, the torsion member 60 and the base plate 75 may be integrally formed together, for example, via casting or additive manufacturing.

Figure 6:
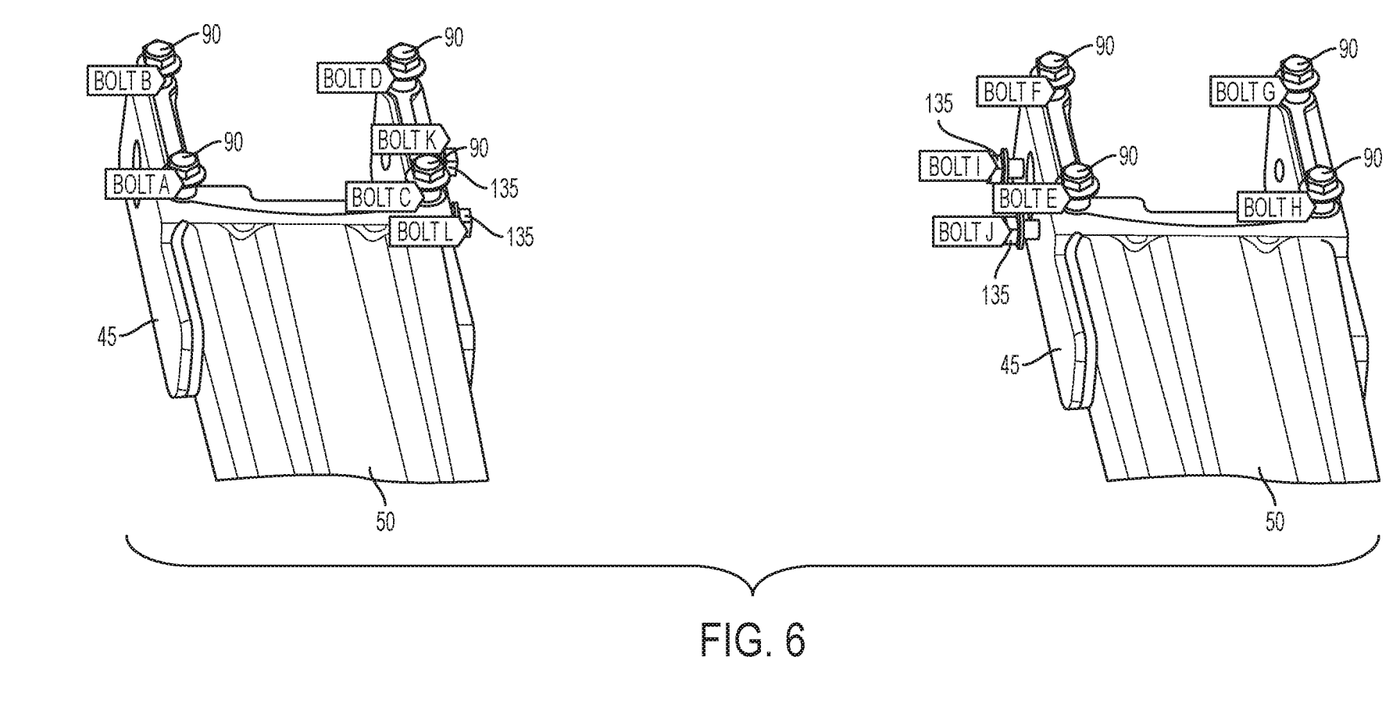
FIG. 6 illustrates a rear right isometric view of a pair of example heel castings for lockable forks using bolts as fasteners.

With reference to FIG. 6, Table 1 shows an example preload placed on bolts A-L when tightened to a torque value of 102 newton meters for bolts A, B, C, D, E, F, G, and H and to a torque value of 55 newton meters for bolts I, J, K, and L. Table 1 also shows an example percentage change of the preload when a simulated load of 1133.981 kg (2,500 lbs) is applied to the forks 40. As shown by the small changes in the preload percentages in Table 1, the load applied to the forks is fairly evenly distributed to the bolts within the bolt pattern shown in FIG. 6.

TABLE 1

| Initial Preload Based on ES-1107 | Bolt Location | Load on Bolt after Applied Load | Percentage of Preload Change |
|---|---|---|---|
| 8,273 $lb_f$ | A | 8,222 $lb_f$ | −0.6% |
| | B | 8,580 $lb_f$ | 3.7% |
| | C | 8,259 $lb_f$ | −0.2% |
| | D | 8,612 $lb_f$ | 4.1% |
| | E | 8,250 $lb_f$ | −0.3% |
| | F | 8,527 $lb_f$ | 3.1% |
| | G | 8,587 $lb_f$ | 3.8% |
| | H | 8,241 $lb_f$ | −0.4% |
| 5,693 $lb_f$ | I | 5,690 $lb_f$ | 0.0% |
| | J | 5,690 $lb_f$ | −0.1% |
| | K | 5,693 $lb_f$ | 0.0% |
| | L | 5,686 $lb_f$ | −0.1% |

In other embodiments, locking components other than bores may be used. For example, with reference to FIG. 7, a battery box and fork assembly 200 includes forks 205 that are locked to the battery box 210, torsion member 215, and locking plates 220 via locking components that engage with an interference, or press, fit. Locking plates 220 may be considered as a base plate first and second locking component in certain embodiments.

Figure 7:
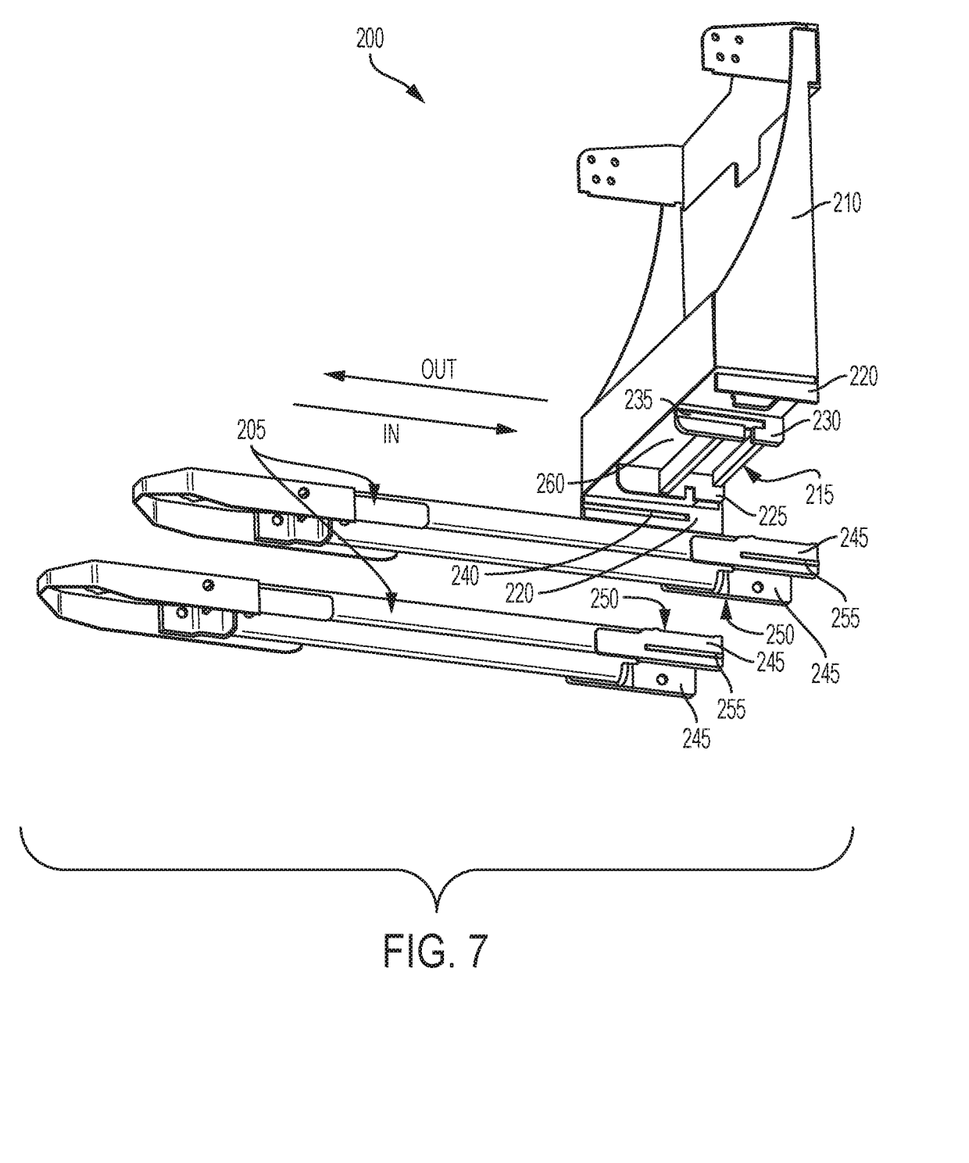
FIG. 7 illustrates a bottom isometric view of an example battery box and lockable fork showing the fork disassembled from the battery box.

Torsion member 215 includes a first side 225 and a second side 230 that each includes a locking component comprising one or more slots 235. Likewise, each of the locking plates 220 includes a locking component comprising one or more slots 240. The sides 245 of heel portions 250 include locking components that comprise one or more protrusions 255 that are sized and shaped to fit into the slots 235 and 240.

To lock the forks 205 to the battery box 210, to the torsion member 215, and to the locking plates 220, the protrusions 255 are aligned with the slots 235 and 240. Each fork 205 is then moved in the direction of arrow IN such that the protrusions 255 engage the slots 235 and 240 with an interference, or press, fit. To unlock the forks 205 from the battery box 210, the the torsion member 215, and the locking plates 225 each fork 205 is moved in the direction of arrow OUT such that the protrusions 255 disengage from the slots 235 and 240.

The location of the protrusions and slots described above may be reversed. Additionally, other suitable locking components, fasteners, or both, may be used. For example, the base plate 260 may include locking components that comprise one or more protrusions (not illustrated) and the heel portion 250 of forks 205 may include a locking component on an upper surface that comprises one or more slots (not illustrated) that are sized and shaped to receive the protrusions on the underside of the base plate 260 with an interference, or press, fit.

While some of the examples have been illustrated or described with respect to providing functionality for a "walkie" or "rider" style pallet truck, some or all of the features may be used with other types of industrial vehicles including, but not limited to, reach trucks, three-wheel stand trucks, warehouse trucks, and counterbalanced trucks.

Having described and illustrated various examples herein, it should be apparent that other examples may be modified in arrangement and detail. We claim all modifications and variations coming within the spirit and scope of the following claims.

The invention claimed is:

1. A battery box and fork arrangement for a vehicle, comprising:
    a battery box configured to retain a battery, the battery box comprising a base plate including a first locking component and a second locking component;
    a torsion member coupled to the base plate, the torsion member including a first side arranged substantially orthogonally to the base plate, the torsion member first side including a third locking component, and a second side arranged substantially orthogonally to the base plate, the torsion member second side including a fourth locking component;
    a first fork comprising a heel end and a toe end, wherein the heel end of the first fork comprises (i) a first surface configured to be locked to the base plate first locking component and including a fifth locking component configured to engage the first locking component of the base plate when the first surface locks to the base plate, and (ii) a second surface configured to be locked to the torsion member first side and including a sixth locking component configured to engage the third locking component of the torsion member first side when the second surface locks to the torsion member first side; and
    a second fork comprising a heel end and a toe end, wherein the heel end of the second fork comprises (i) a first surface configured to be locked to the base plate second locking component and including a seventh locking component configured to engage the second locking component of the base plate when the first surface locks to the base plate, and (ii) a second surface configured to be locked to the torsion member second side and including an eighth locking component configured to engage the fourth locking component of the torsion member second side when the second surface locks to the torsion member second side.

2. The battery box and fork arrangement of claim 1, wherein the first locking component comprises a first bore, the second locking component comprises a second bore, the third locking component comprises a third bore, the fourth locking component comprises a fourth bore, the fifth locking component comprises a fifth bore, the sixth locking component comprises a sixth bore, the seventh locking component comprises a seventh bore, and the eighth locking component comprises an eighth bore; and further comprising:
    a first fastener locking the first fork first surface to the base plate via the first and fifth bores;
    a second fastener locking the first fork second surface to the torsion member first side via the third and sixth bores;
    a third fastener locking the second fork first surface to the base plate via the second and seventh bores; and
    a fourth fastener locking the second fork second surface to the torsion member second side via the fourth and eighth bores.

3. The battery box and fork arrangement of claim 1, wherein the first locking component comprises a first plurality of bores, the second locking component comprises a second plurality of bores, the third locking component comprises a third plurality of bores, the fourth locking component comprises a fourth plurality of bores, the fifth locking component comprises a fifth plurality of bores, the sixth locking component comprises a sixth plurality of bores, the seventh locking component comprises a seventh plurality of bores, and the eighth locking component comprises an eighth plurality of bores; and further comprising:
    a first plurality of fasteners locking the first fork first surface to the base plate via the first plurality of bores and the fifth plurality of bores;
    a second plurality of fasteners locking the first fork second surface to the torsion member first side via the third plurality of bores and the sixth plurality of bores;
    a third plurality of fasteners locking the second fork first surface to the base plate via the second plurality of bores and the seventh plurality of bores; and
    a fourth plurality of fasteners locking the second fork second surface to the torsion member second side via the fourth plurality of bores and the eighth plurality of bores.

4. The battery box and fork arrangement of claim 3, wherein
    the fifth plurality of bores are disposed about a perimeter of the top surface of the heel end of the first fork; and
    the seventh plurality of bores are disposed about a perimeter of the top surface of the heel end of the second fork.

5. The battery box and fork arrangement of claim 3, wherein the first plurality of fasteners comprises a plurality of bolts, the second plurality of fasteners comprises a plurality of bolts, the third plurality of fasteners comprises a plurality of bolts, and the fourth plurality of fasteners comprises a plurality of bolts.

6. The battery box and fork arrangement of claim 1, wherein the first locking component comprises a first protrusion, the second locking component comprises a second protrusion, the third locking component comprises a third protrusion, the fourth locking component comprises a fourth protrusion, the fifth locking component comprises a first slot configured to receive the first protrusion, the sixth locking component comprises a second slot configured to receive the second protrusion, the seventh locking component comprises a third slot configured to receive the third protrusion, and the eighth locking component comprises a fourth slot configured to receive the fourth protrusion.

7. The battery box and fork arrangement of claim 1, wherein the base plate and the torsion member are integrally formed together.

8. The battery box and fork arrangement of claim 1, wherein:

the first fork comprises a heel portion, and wherein the first surface configured to be locked to the base plate and the fifth locking component of the first fork are located on a top surface of the heel portion, and the second surface configured to be locked to the torsion member first side and the sixth locking component are located on a side of the heel portion substantially orthogonal to the top surface; and the second fork comprises a heel portion, and wherein the first surface configured to be locked to the base plate and the seventh locking component of the second fork are located on a top surface of the heel portion, and the second surface configured to be locked to the torsion member second side and the eighth locking component are located on a side of the heel portion substantially orthogonal to the top surface.

9. The battery box and fork arrangement of claim 8, wherein
the top surface of the heel portion of the first fork is substantially smooth to facilitate locking to the base plate of the battery box; and
the top surface of the heel portion of the second fork is substantially smooth to facilitate locking to the base plate of the battery box.

10. The battery box and fork arrangement of claim 9, wherein:
a side surface of the heel portion of the first fork is substantially smooth to facilitate locking to the first side of the torsion member; and
a side surface of the heel portion of the second fork is substantially smooth to facilitate locking to the second side of the torsion member.

11. The battery box and fork arrangement of claim 10, wherein:
the substantially smooth side surface of the heel portion of the first fork comprises a machined surface; and
the substantially smooth side surface of the heel portion of the second fork comprises a machined surface.

12. The battery box and fork arrangement of claim 8, wherein:
the top surface of the heel portion of the first fork comprises a boss, and wherein the fifth locking component comprises a plurality of bores disposed in the boss; and
the top surface of the heel portion of the second fork comprises a boss, and wherein the seventh locking component comprises a plurality of bores disposed in the boss.

13. The modular battery box and fork arrangement of claim 12, wherein the top surface of the boss of the first fork comprises a machined surface and the top surface of the boss of the second fork comprises a machined surface.

14. A modular lockable fork for a vehicle, comprising:
a heel end and a toe end, wherein the heel end comprises (i) a first surface configured to be locked to a battery box, the first surface including a first locking component configured to engage a locking component of the battery box when the first surface locks to the battery box, and (ii) a second surface configured to be locked to a torsion member coupled to the battery box, the second surface including a second locking component configured to engage a locking component of the torsion member when the second surface locks to the torsion member.

15. The modular lockable fork of claim 14, wherein the heel end comprises a heel portion, and wherein the heel portion comprises the first surface configured to be locked to a battery box and the second surface configured to be locked to a torsion member.

16. The modular lockable fork of claim 15, wherein a top surface of the heel portion comprises a boss and wherein the first locking component is disposed in the boss.

17. The modular lockable fork of claim 16, wherein a top surface of the boss comprises a machined surface.

18. The modular lockable fork of claim 17, wherein the first locking component comprises a first plurality of threaded blind bores and the second locking component comprises a second plurality of threaded blind bores.

19. The modular lockable fork of claim 18, wherein the second surface of the heel portion comprises a machined surface.

20. The modular lockable fork of claim 19, wherein the first plurality of threaded blind bores are disposed at corners of the boss.

* * * * *